(12) United States Patent
Takano et al.

(10) Patent No.: US 6,335,612 B2
(45) Date of Patent: Jan. 1, 2002

(54) BATTERY CHARGER AND METHOD OF DETECTING A FULLY CHARGED CONDITION OF A SECONDARY BATTERY

(75) Inventors: Nobuhiro Takano, Hitachinaka; Shigeru Moriyama, Kumamoto, both of (JP)

(73) Assignee: Hitachi Koki Co., Ltd., Tokyo (JP)

( * ) Notice: Subject to any disclaimer, the term of this patent is extended or adjusted under 35 U.S.C. 154(b) by 0 days.

(21) Appl. No.: 09/727,588

(22) Filed: Dec. 4, 2000

(30) Foreign Application Priority Data

Dec. 3, 1999 (JP) .................................................. 11-344299

(51) Int. Cl.$^7$ .................................................. H01M 10/44
(52) U.S. Cl. .............................................................. 320/150
(58) Field of Search .................................... 320/128, 150, 320/151, 152

(56) References Cited

U.S. PATENT DOCUMENTS 4,755,735 A * 7/1988 Inakagata ...................... 320/150

* cited by examiner

*Primary Examiner*—Edward H. Tso
(74) *Attorney, Agent, or Firm*—Sughrue Mion, PLLC

(57) ABSTRACT

A battery charger is capable of accurately determining that a battery has reached a fully charged condition regardless of the kind of the batteries to be charged, the condition of the battery, battery temperature at the time when charging starts, charge current, and ambient temperature. A battery temperature is sampled at every predetermined timing, and a change in battery temperature rise gradient is computed each time the battery temperature is sampled. It is determined that the battery has reached the fully charged condition based on a transition changing from increment to decrement of the change in battery temperature rise gradient.

9 Claims, 3 Drawing Sheets

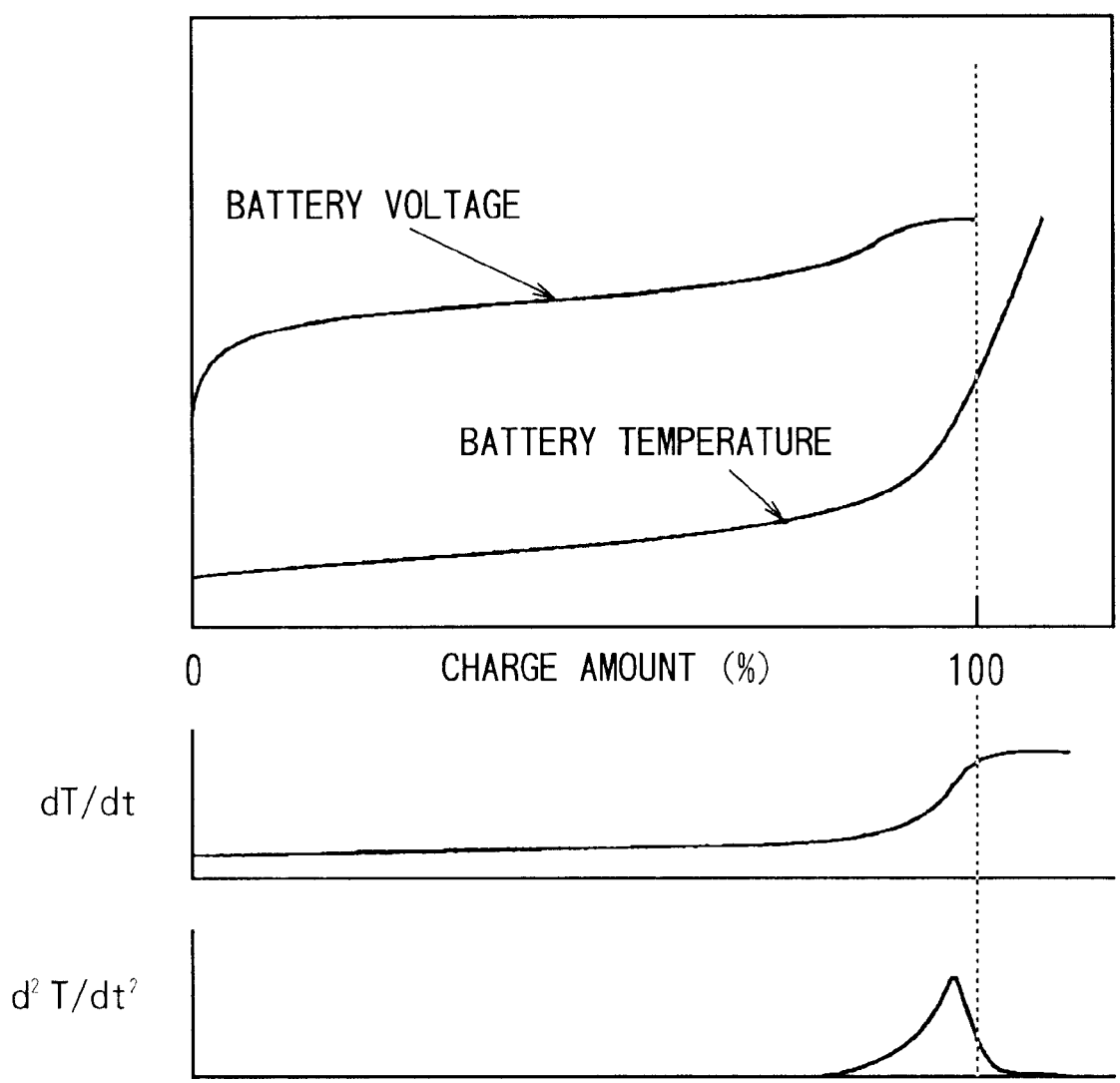

BATTERY CHARGER AND METHOD OF DETECTING A FULLY CHARGED CONDITION OF A SECONDARY BATTERY

BACKGROUND OF THE INVENTION

1. Field of the Invention

The present invention relates to a battery charger and a method of detecting a fully charged condition of a secondary battery such as a nickel-cadmium battery and a nickel-hydrogen battery.

2. Description of the Related Art

Various methods have been proposed in the art to detect the fully charged condition of a secondary battery. One is to sample battery voltage at every predetermined timing. When the peak voltage appearing at the charge termination period is detected, it is determined that the battery has reached a fully charged condition. This method will hereinafter be referred to as "peak voltage detection method". Another method is to detect battery temperature at every predetermined timing and compute a rate of temperature rise, that is, a temperature rise gradient. When the temperature rise gradient has exceeded a predetermined value, the battery is determined to be fully charged. This method will hereinafter referred to as "dT/dt detection method".

The peak voltage detection method is not suitable for the batteries which exhibit battery charge characteristic with no clear peak voltage. Such batteries include a nickel-hydrogen battery.

The dT/dt detection method, on the other hand, may fail to detect the fully charged condition of the battery. In the dT/dt detection method, the temperature rise gradient is compared with a fixed critical value. As such, detection of the fully charged condition of the battery is made based, among other things, only on the temperature rise gradient. Other factors, such as the kind of the battery to be charged, the condition of the battery, battery temperature at the time when charging starts, charge current, or ambient temperature, are not considered for determining the fully charged condition. Those unconsidered factors may increase the battery temperature rise gradient more than the fixed critical value despite the fact that the battery has not yet reached the fully charged condition. In such a case, charging is stopped before the battery is fully charged, so the battery is undercharged. On the other hand, the battery temperature rise gradient may not increase more than the fixed critical value despite the fact that the battery has reached the fully charged condition. In this case, the battery is overcharged because charging will not stop even if the battery is fully charged. Overcharging the battery may cause electrolyte to leak out from the battery attendant to gas generation occurring at the charge termination period. This shortens a cycle lifetime of the battery.

If with the dT/dt detection method, the critical value used for evaluating the temperature rise gradient is varied depending on the kind of the battery to be charged, the condition of the battery, battery temperature at the time when charging starts, charge current, or ambient temperature, the battery charger employing the dT/dt detection method and the control of the battery charger will become complicated.

SUMMARY OF THE INVENTION

Accordingly, it is an object of the present invention to provide a battery charger and a method of accurately detecting a fully charged condition of a secondary battery regardless of the kind of the battery to be charged, the condition of the battery, battery temperature at the time when charging starts, charge current, or ambient temperature.

To achieve the above and other object, there is provided, according to one aspect of the present invention, a controlling method of a battery charger, including the steps of:

a) starting charging a battery;

b) sampling a battery temperature at every predetermined timing;

a) computing a change in battery temperature rise gradient each time the battery temperature is sampled; and d) determining that the battery has reached a fully charged condition based on a transition changing from increment to decrement of the change in battery temperature rise gradient.

Step d) may include the steps of:

d1) obtaining a maximum value of the change in battery temperature rise gradient at every sampling of the battery temperature; and d2) determining that the battery has reached the fully charged condition when an updated value of the change in battery temperature rise gradient falls a predetermined value from the maximum value.

Step d) may include the steps of:

d3) detecting that the change in battery temperature rise gradient exceeds a first predetermined value:

d4) after step d3), detecting that the change in battery temperature rise gradient falls below a second predetermined value; and d5) after step d4), determining that the battery has reached the fully charged condition.

According to another aspect of the invention, there is provided a battery charger which includes: a battery temperature sensing device for sensing a battery temperature and outputting a battery temperature signal indicative of the battery temperature; sampling means for sampling the battery temperature signal at every predetermined timing; computing means for computing a change in battery temperature rise gradient and outputting an updated value of the change in battery temperature rise gradient each time the battery temperature is sampled; determining means for determining that the battery has reached a fully charged condition based on a transition changing from increment to decrement of the change in battery temperature rise gradient.

In one embodiment, the determining means designates a maximum value of the change in battery temperature rise gradient at every sampling of the battery temperature, and determines that the battery has reached the fully charged condition when the updated value of the change in battery temperature rise gradient falls a predetermined value from the maximum value.

In another embodiment, the determining means detects that the change in battery temperature rise gradient exceeds a first predetermined value and thereafter detects that the change in battery temperature rise gradient falls below a second predetermined value, whereupon the determining means determines that the battery has reached the fully charged condition.

BRIEF DESCRIPTION OF THE DRAWINGS

The particular features and advantages of the invention as well as other objects will become apparent from the following description taken in connection with the accompanying drawings, in which:

FIG. 3 is a graphical representation showing battery temperature, battery temperature rise gradient, and change in the battery temperature rise gradient during charging of the battery.

DETAILED DESCRIPTION OF THE PREFERRED EMBODIMENT

A battery charger according to a preferred embodiment of the present invention will be described while referring to the accompanying drawings.

Figure 1:
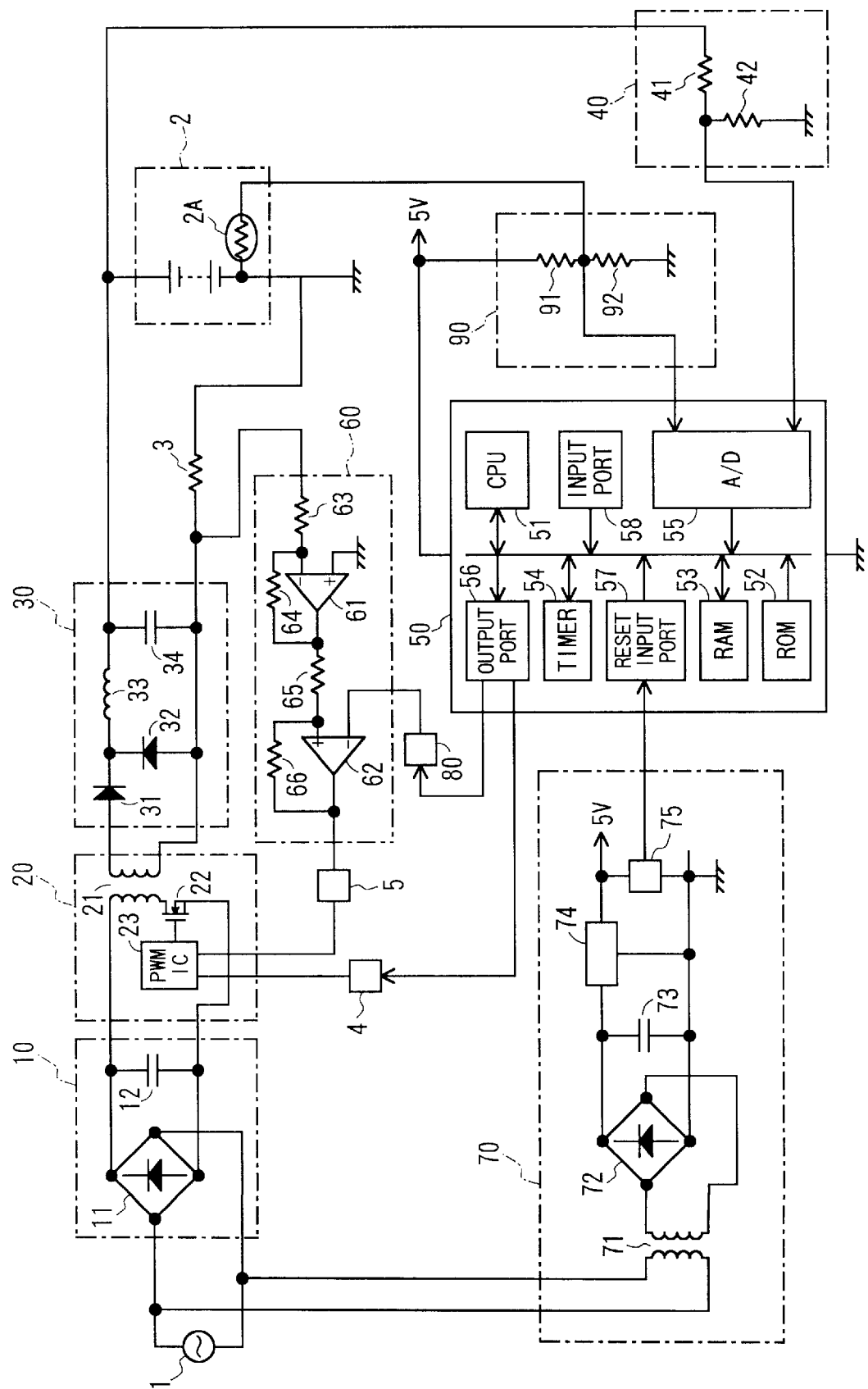
FIG. 1 is a circuit diagram showing a structure of the battery charger according to a preferred embodiment of the present invention.

To charge a battery 2 with the battery charger shown in FIG. 1, the battery 2 is connected between a rectifying/smoothing circuit 30 (to be described later) and ground. The battery 2 consists of a plurality of cells connected in series. A temperature detecting device 2A, such as a thermistor, is provided in contact with or in proximity to the battery 2 for detecting the temperature of the battery 2.

The battery charger includes a resistor 3 serving as a current detector for detecting a charge current flowing in the battery 2. A rectifying/smoothing circuit 10 is connected to an A.C. power source 1 for converting the A.C. voltage to D.C. voltage. The circuit 10 includes a full-wave rectifier 11 and a smoothing capacitor 12. A switching circuit 20 is connected to the output of the rectifying/smoothing circuit 10 and includes a high frequency transformer 21, a MOSFET 22, and a PWM (pulse width modulation) controlling IC 23. The PWM controlling IC 23 regulates the output of the rectifying/smoothing circuit 10 by changing the width of driving pulses applied to the MOSFET 22. Another rectifying/smoothing circuit 30 is connected to the output of the switching circuit 20. The circuit 30 includes diodes 31, 32, a choke coil 33, and a smoothing capacitor 34. A battery voltage detection section 40 is connected in parallel to the battery 2, which includes two resistors 41 and 42 connected in series. The voltage across the battery 2 is divided with a ratio of resistances of the two resistors 41 and 42. The output of the battery voltage detection section 40 is taken out from the junction of the resistors 41 and 42.

The battery charger further includes a microcomputer 50 having a CPU 51, a ROM 52, a RAM 53, a timer 54, an A/D converter 55, an output port 56, a reset input port 57, and an input port 58 which are mutually connected by a bus. As will be described later, the CPU 51 implements various jobs in accordance with programs stored in the ROM 52. Specifically, the CPU 51 detects the battery temperature at every sampling. The RAM 53 stores the latest predetermined number of battery temperature values, for example, the latest six battery temperature values. Each time the battery temperature is detected, the battery temperature data stored in the RAM 53 is shifted in a manner to expel the oldest battery temperature data and to join the newest data, yet storing the latest six battery temperature values.

The CPU 51 computes battery temperature rise gradient each time the battery temperature is sampled. The battery temperature rise gradient is computed by subtracting the oldest battery temperature value from the newest battery temperature value while referring to the data stored in the RAM 53. The RAM 53 stores the latest predetermined number of battery temperature rise gradients, for example, the latest six battery temperature rise gradients. Each time the battery temperature rise gradient is computed, the battery temperature rise gradient data stored in the RAM 53 is shifted in a manner to expel the oldest battery temperature rise gradient data and to join the newest data, yet storing the latest six battery temperature rise gradient values.

The CPU 51 further computes a change in battery temperature rise gradient each time the battery temperature is sampled. The change in battery temperature rise gradient is computed by subtracting the oldest battery temperature rise gradient value from the newest battery temperature rise gradient value while referring to the data stored in the RAM 53. Each time the change in battery temperature rise gradient is computed, the CPU 51 checks if the thus computed change in battery temperature exceeded the maximum value ever recorded. If so, the maximum value of the change in battery temperature rise gradient stored in the RAM 53 is updated.

A charge current control section 60 is connected between the current detector (resistor) 3 and the switching circuit 20 to maintain the charge current at a predetermined level. The charge current control section 60 includes cascade-connected operational amplifiers 61 and 62, and resistors 63 through 66.

A constant voltage power supply 70 is provided for supplying constant voltages to the microcomputer 50 and the charge current control section 60. The constant voltage power supply 70 includes a transformer 71, a full-wave rectifier 72, a smoothing capacitor 73, a three-terminal voltage regulator 74, and a reset IC 75. The reset IC 75 issues a reset signal to the reset input port 57 of the microcomputer 50 to reset the same. A charge current setting section 80 is connected between the output port 56 of the microcomputer 50 and the inverting input terminal of the operational amplifier 62. The charge current setting section 80 is responsive to the signal output from the microcomputer 50 and sets the charge current by changing the voltage applied to the inverting input terminal of the operational amplifier 62.

A photo-coupler 4 is connected between the output port 56 of the microcomputer 50 and the PWM controlling IC 23 of the switching circuit 20. The photo-coupler 4 transmits signals from the microcomputer 50 to the PWM controlling IC 23 to control start and stop of charging Another photo-coupler 5 is connected between the output of the charge current setting section 60 and the PWM controlling IC 23. The photo-coupler 5 feeds back the charge current signal to the PWM controlling IC 23.

A battery temperature detecting section 90 is connected between the battery temperature detecting device 2A and the A/D converter 55 of the microcomputer 50. The battery temperature detecting section 90 includes resistors 91 and 92 connected in series. The series-connected resistors 91 and 92 are connected between the constant voltage source of 5V and ground. The battery temperature detecting device 2A is connected between the junction of the resistors 91, 92 and ground. That is, the battery temperature detecting device 2A and the resistor 92 are connected in parallel between the resistor 91 and ground. The resistance of the battery temperature detecting device 2A changes depending on the temperature of the battery 2. As a result, the voltage developed across the resistor 92 changes depending on the temperature of the battery 2 and is applied to the A/D converter 55.

Figure 2:
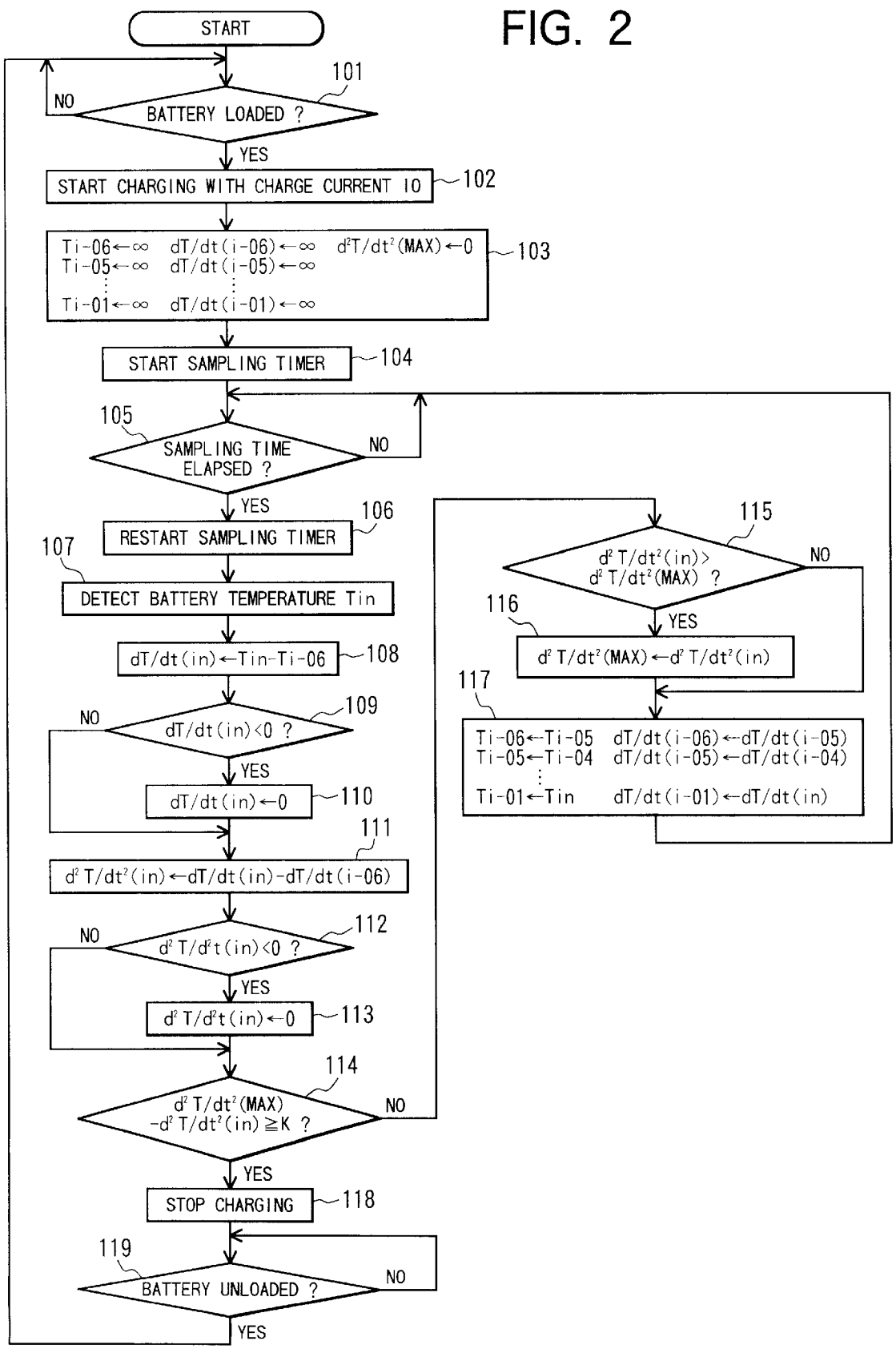
FIG. 2 is a flowchart illustrating the operation of the battery charger shown in FIG. 1.

Next, a description of operations of the battery charger will be given while referring to the flowchart shown in FIG. 2. Hereinafter individual steps will be referred to with an "S" followed by the step number When power is turned ON, the microcomputer 50 prompts the operator to load a battery 2 in the charger (S101). When, by referring to the signal output from the battery voltage detection section 40, the microcomputer 50 determines that the battery 2 is loaded (S101: YES), the microcomputer 50 outputs a charge start signal from the output port 56 to the PWM control IC 23 via the photocoupler 4. Also, the microcomputer 50 applies a charge current setting reference voltage ViO to the operational amplifier 62 via the charge current setting section 80, to thereby start charging with a charge current IO (S102).

During charging the battery 2, an actual charge current flowing through the battery 2 is detected at the resistor 3. A reference voltage corresponding to a target charge current is subtracted from the voltage corresponding to the actual charge current detected at the resistor 3, and the resultant difference signal is fed back to the PWM control IC 23 via the photo-coupler 5. More specifically, the width of the pulse applied to the high frequency transformer 21 is reduced when the actual charge current is greater than the target charge current whereas the width of the pulse applied to the high frequency transformer 21 is increased when the actual charge current is less than the target charge current. The output from the secondary winding of the high frequency transformer 21 is subjected to rectification and smoothing by the rectifying/smoothing circuit 30. In this way, the charge current is substantially maintained at a predetermined value, i.e., the target charge current IO.

Next, it is detected that the loaded battery has reached a fully charged condition. To this effect, the RAM 53 is reset (S103). The RAM 53 stores the latest six battery temperature values Ti-06, Ti-05, . . . ,Ti-01 detected through the latest six samplings, and the latest six battery temperature rise gradient values dT/dt(i-06), dT/dt(i-05, . . . , dT/dt(i-01). The RAM 53 further stores the maximum value of the change in temperature rise gradient values $d^2T/dt^2(MAX)$. Each time the battery temperature is sampled, the battery temperature rise gradient is computed by subtracting the oldest battery temperature value (as detected at the time six samplings ahead of the current sampling) from the newest temperature value, and also a change in temperature rise gradient is computed by subtracting the oldest battery temperature rise gradient value (as computed at the time six samplings ahead of the current sampling) from the newest battery temperature rise gradient value while referring to the data stored in the RAM 53. It is to be noted that in the flowchart, the symbol (infinite) indicates the maximum digital value of the A/D conversion.

In S104, the timer 54 is started to measure the sampling time. When t has elapsed from the start of the timer 54 (S105), the timer 54 is restarted (S106).

Next, the voltage developed across the resistor 92 of the battery temperature detecting section 90 is applied to the A/D converter 55 where the applied voltage is converted to a digital signal Tin (S107) which will be referred to as a battery temperature signal. The battery temperature signal Tin is indicative of the battery temperature detected by the battery temperature detecting device 2A. In S108, a battery temperature rise gradient is computed by the CPU 51 of the microcomputer 50 based on the updated battery temperature signal Tin and the battery temperature signal Ti-06 obtained at the time of six samplings ahead of the present sampling Specifically, the battery temperature rise gradient dT/dt(in) for the updated battery temperature Ti is computed in accordance with the following equation:

$$dT/dt(in)=Tin-(Ti-06)$$

Next, it is determined that the battery temperature rise gradient dT/dt(in) is negative (S109). When the battery temperature rise gradient dt/dt(in) is negative (S109: YES), the value of dT/dt(in) is replaced by 0 (zero) (S110), on the other hand, when the value of dT/dt(in) is positive (S109:NO), the routine skips S110 and proceeds to S111 where a change in battery temperature rise gradient corresponding to the updated battery temperature Tin is computed based on the updated battery temperature rise gradient dT/dt(in) and the battery temperature rise gradient dT/dt(in-06) corresponding to the battery temperature detected at the time six samplings ahead of the present sampling. Specifically, the change in the battery temperature rise gradient corresponding to the updated battery temperature Tin is computed in accordance with the following equation (S111).

$$d^2T/dt^2(in)=dT/dt(in)-dT/dt(i-06)$$

Next, it is determined that the change in battery temperature rise gradient $d^2T/dt^2(in)$ thus computed is negative (S112). When the change in battery temperature rise gradient $d^2T/dt^2(in)$ is negative (S112:YES), the value of $d^2T/dt^2(in)$ is replaced by 0 (zero) (S113). On the other hand, when the change in battery temperature rise gradient $d^2T/dt^2(in)$ is positive (S112:NO), the routine skips S113 and proceeds to S114. In S114, the CPU 51 compares the value of $d^2T/dt^2(in)$ with the maximum value of the change in battery temperature rise gradient $d^2T/dt^2(MAX)$ and determined that the latter is greater than the former by a predetermined constant K or more, i.e., $d^2T/dt^2(MAX)-d^2T/dt^2(in) \geq K$. When this condition is met, the microcomputer 50 issues a charge stop signal from the output port 56 to the PWM control IC 23 via the photo-coupler 4 to stop charging (S118). Thereafter, it is determined that the battery 2 has been unloaded (S119). When it is determined that the battery 2 has been unloaded, the routine returns to S101 and waits for loading of another battery 2.

When determination made in S114 is negative, i.e., when the condition $d^2T/dt^2(MAX)-d^2T/dt^2(in) \geq K$ is not met (S114:NO), then the routine proceeds to S115 where comparison of $d^2T/dt^2(in)$ to $d^2T/dt^2(MAX)$ is made. When the former is greater than the latter (S115: YES), the value of $d^2T/dt^2(MAX)$ is updated by substituting the value of $d^2T/dt^2(in)$ into $d^2T/dt^2(MAX)$ (S116). When the former is less than the latter (S115: NO), the routine skips S116 and proceeds to S117 where the latest six sampling data stored in the memory 53 are shifted to update the stored data. Specifically, the battery temperature values Ti-06, Ti-05, . . . ,Ti-01 stored in the memory 53 are shifted in such a manner that the value T0-06 is expelled, and the values Ti-05, . . . ,Ti-01 are shifted to Ti-06, . . . ,Ti-02, respectively. The battery temperature Tin detected in S107 is stored in the memory 53 as Ti-01. The battery temperature rise gradient values for the latest six samplings are also shifted in the same manner. That is, the stored dT/dt(i-06) indicative of the battery temperature rise gradient computed at the time six samplings ahead of the present sampling is expelled, and the gradient values of dT/dt(i-05), . . . ,dT/dt(i-01) are shifted to dT/dt(i06), . . . ,dT/dt(i-02), respectively. The gradient value newly computed at S108 is stored as dT/dt(i-01). Upon completion of rewriting of the data in S117, the routine returns to S105 and repeats the sampling and computing processes in S105 et seq.

Typically, the battery temperature gradually increases as shown in FIG. 3. Therefore, the determination made in S114 is "NO" and the determination made in S115 is "YES", resulting in updating the $d^2T/dt^2(MAX)$. However, immediately before the battery is fully charged, the change in the battery temperature rise gradient does no longer increase and shows the absolute maximum as shown in FIG. 3. The charging of the battery is continued until the difference between the absolute maximum and the updated $d^2T/dt^2$(in) is equal to or greater than the predetermined constant (S114:YES). The predetermined constant is determined to meet the fully charged condition of the battery. In this manner, it is determined that the battery has reached a fully charged condition when a transit from increment to decrement of the change in battery temperature rise gradient is detected.

While the invention has been described in detail with reference to a specific embodiment thereof, it would be apparent to those skilled in the art that various changes and modifications may be made therein without departing from the spirit of the invention. For example, determination that the battery has reached the fully charged condition may be made when the change in battery temperature rise gradient exceeds a first predetermined value and than falls below a second predetermined value. With this detection, the absolute maximum of the change in the battery temperature rise gradient resides in between two time instances when the battery temperature rise gradient exceeds the first predetermined value and then falls below the second predetermined value.

What is claimed is:

1. A controlling method of a battery charger, comprising the steps of:
   a) starting charging a battery;
   b) sampling a battery temperature at every predetermined timing;
   c) computing a change in battery temperature rise gradient each time the battery temperature is sampled; and
   d) determining that the battery has reached a fully charged condition based on a transition changing from increment to decrement of the change in battery temperature rise gradient.

2. The controlling method according to claim 1, wherein step d) comprises the steps of:
   d1) obtaining a maximum value of the change in battery temperature rise gradient at every sampling of the battery temperature; and
   d2) determining that the battery has reached the fully charged condition when an updated value of the change in battery temperature rise gradient falls a predetermined value from the maximum value.

3. The controlling method according to claim 1, wherein step d) comprises the steps of:
   d3) detecting that the change in battery temperature rise gradient exceeds a first predetermined value;
   d4) after step d3), detecting that the change in battery temperature rise gradient falls below a second predetermined value; and
   d5) after step d4), determining that the battery has reached the fully charged condition.

4. A battery charger comprising:
   a battery temperature sensing device for sensing a battery temperature and outputting a battery temperature signal indicative of the battery temperature;
   sampling means for sampling the battery temperature signal at every predetermined timing;
   computing means for computing a change in battery temperature rise gradient and outputting an updated value of the change in battery temperature rise gradient each time the battery temperature is sampled;
   determining means for determining that the battery has reached a fully charged condition based on a transition changing from increment to decrement of the change in battery temperature rise gradient.

5. The battery charger according to claim 4, wherein said determining means designates a maximum value of the change in battery temperature rise gradient at every sampling of the battery temperature, and determines that the battery has reached the fully charged condition when the updated value of the change in battery temperature rise gradient falls a predetermined value from the maximum value.

6. The battery charger according to claim 4, wherein said determining means detects that the change in battery temperature rise gradient exceeds a first predetermined value and thereafter detects that the change in battery temperature rise gradient falls below a second predetermined value, whereupon said determining means determines that the battery has reached the fully charged condition.

7. A battery charger comprising:
   a battery temperature sensing device which senses a battery temperature and outputs a battery temperature signal indicative of the battery temperature;
   a sampling device which samples the battery temperature signal at a predetermined interval;
   a computing device which computes a change in battery temperature rise gradient and outputs an updated value of the change in battery temperature rise gradient each time the battery temperature is sampled;
   a determining device which determines that the battery has reached a fully charged condition based on a transition such that the change in battery temperature rise gradient changes from positive to negative.

8. The battery charger according to claim 7, wherein said determining device designates a maximum value of the change in battery temperature rise gradient at every sampling of the battery temperature, and determines that the battery has reached the fully charged condition when the updated value of the change in battery temperature rise gradient falls a predetermined value from the maximum value.

9. The battery charger according to claim 7, wherein said determining device detects that the change in battery temperature rise gradient exceeds a first predetermined value and thereafter detects that the change in battery temperature rise gradient falls below a second predetermined value, whereupon said determining device determines that the battery has reached the fully charged condition.

* * * * *